No. 667,009. Patented Jan. 29, 1901.
C. ENGBERG.
BOX MAKING MACHINE.
(Application filed May 16, 1900.)
(No Model.) 5 Sheets—Sheet 1.

WITNESSES:
William P. Goebel.
Theo. J. Hoster

INVENTOR
Carl Engberg.
BY
ATTORNEYS

No. 667,009. Patented Jan. 29, 1901.
C. ENGBERG.
BOX MAKING MACHINE.
(Application filed May 16, 1900.)
(No Model.) 5 Sheets—Sheet 2.

WITNESSES:
William P. Goebel.
Theo. J. Hostetz

INVENTOR
Carl Engberg.
BY
ATTORNEYS

No. 667,009. Patented Jan. 29, 1901.
C. ENGBERG.
BOX MAKING MACHINE.
(Application filed May 16, 1900.)
(No Model.) 5 Sheets—Sheet 4.

WITNESSES:
William P. Goebel
Theo. J. Hostetz

INVENTOR
Carl Engberg.
BY
ATTORNEYS

No. 667,009. Patented Jan. 29, 1901.
C. ENGBERG.
BOX MAKING MACHINE.
(Application filed May 16, 1900.)
(No Model.) 5 Sheets—Sheet 5.
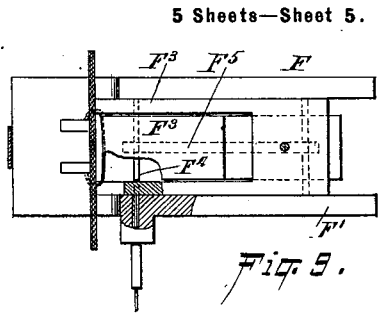
Fig. 9.
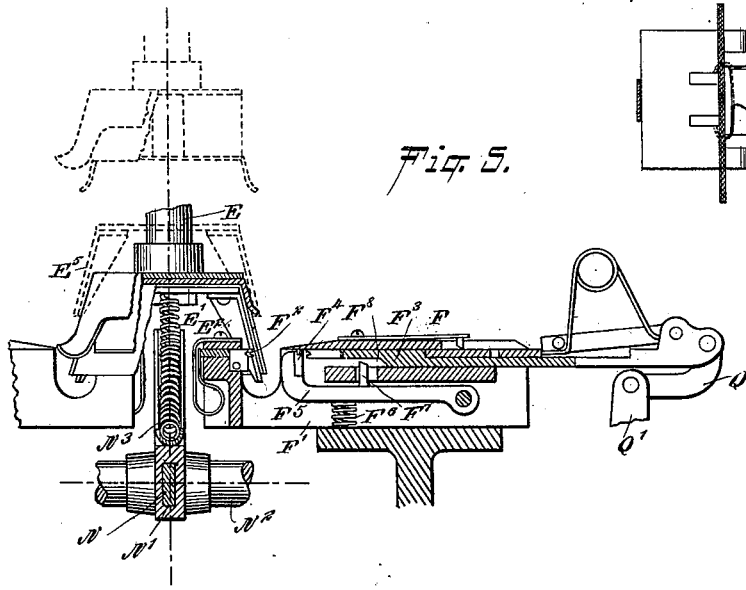
Fig. 5.
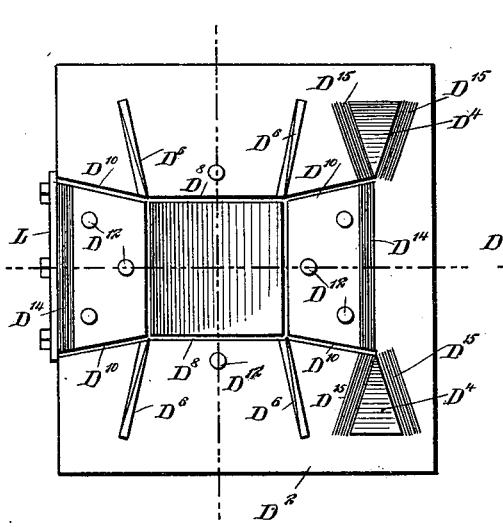
Fig. 6.
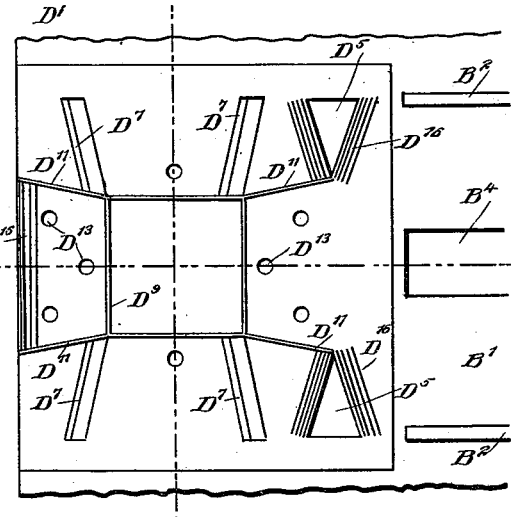
Fig. 7.
Fig. 8.
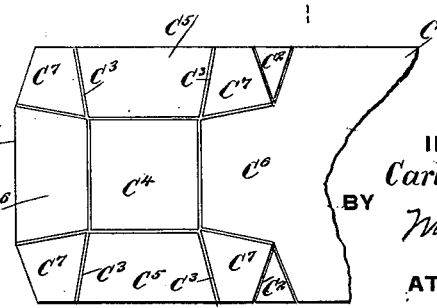
WITNESSES:
William P. Goebel
Rev. G. Hooker
INVENTOR
Carl Engberg.
BY
ATTORNEYS

UNITED STATES PATENT OFFICE.

CARL ENGBERG, OF ST. JOSEPH, MICHIGAN, ASSIGNOR TO JOHN W. MULLEN AND ABEL W. WELLS, OF SAME PLACE.

BOX-MAKING MACHINE.

SPECIFICATION forming part of Letters Patent No. 667,009, dated January 29, 1901.

Application filed May 16, 1900. Serial No. 16,861. (No model.)

*To all whom it may concern:*

Be it known that I, CARL ENGBERG, a citizen of the United States, and a resident of St. Joseph, in the county of Berrien and State of Michigan, have invented a new and Improved Box-Making Machine, of which the following is a full, clear, and exact description.

The object of the invention is to provide a new and improved box-making machine more especially designed for forming boxes from an endless sheet of paper, metal, or other suitable stock and arranged to successively cut and form the box-blanks from the sheet, to fold the sides and flaps of the blanks into position for a box-body, to unite the sides and flaps by staples, and to finally discharge the finished box from the machine.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
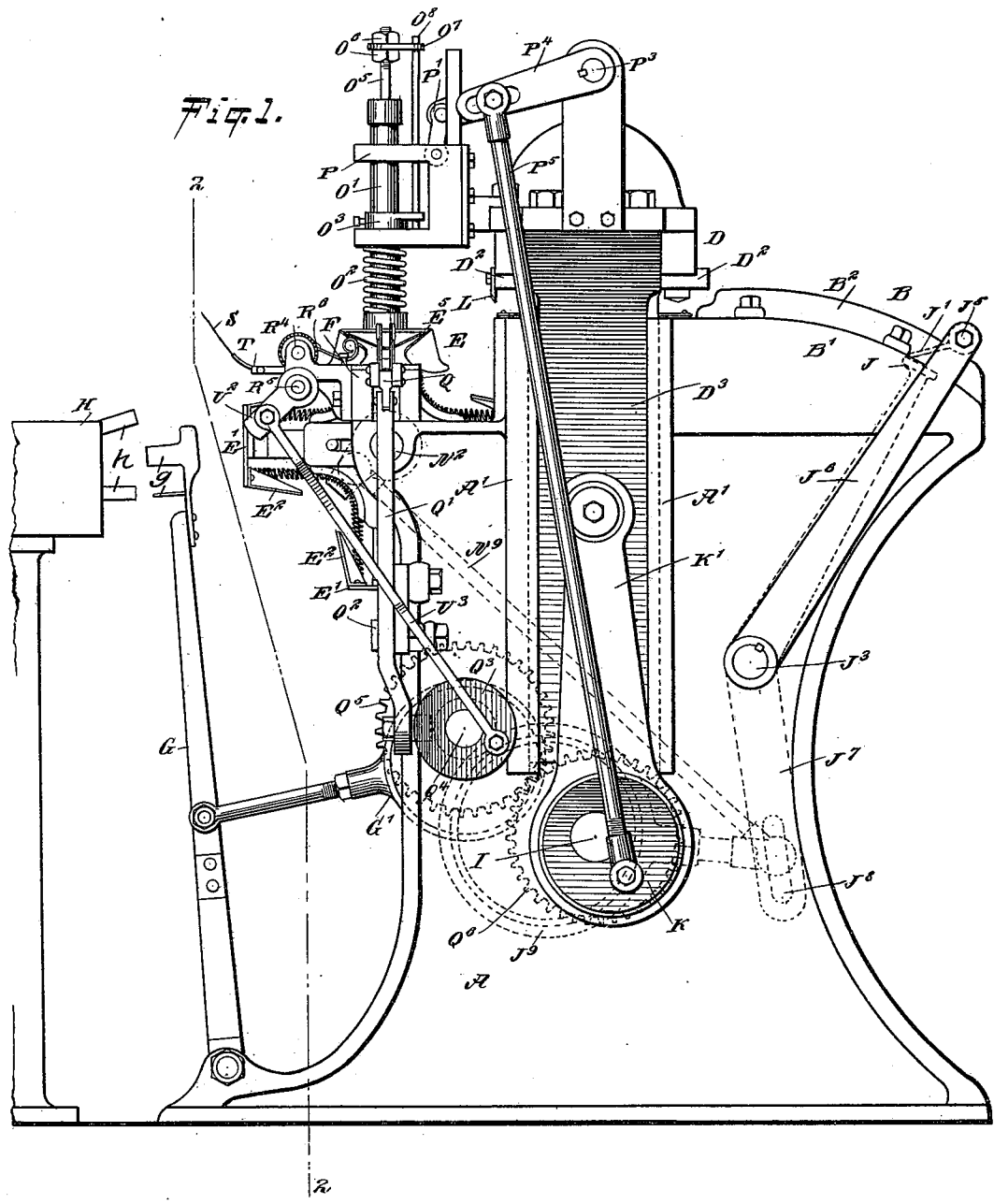
Figure 2:
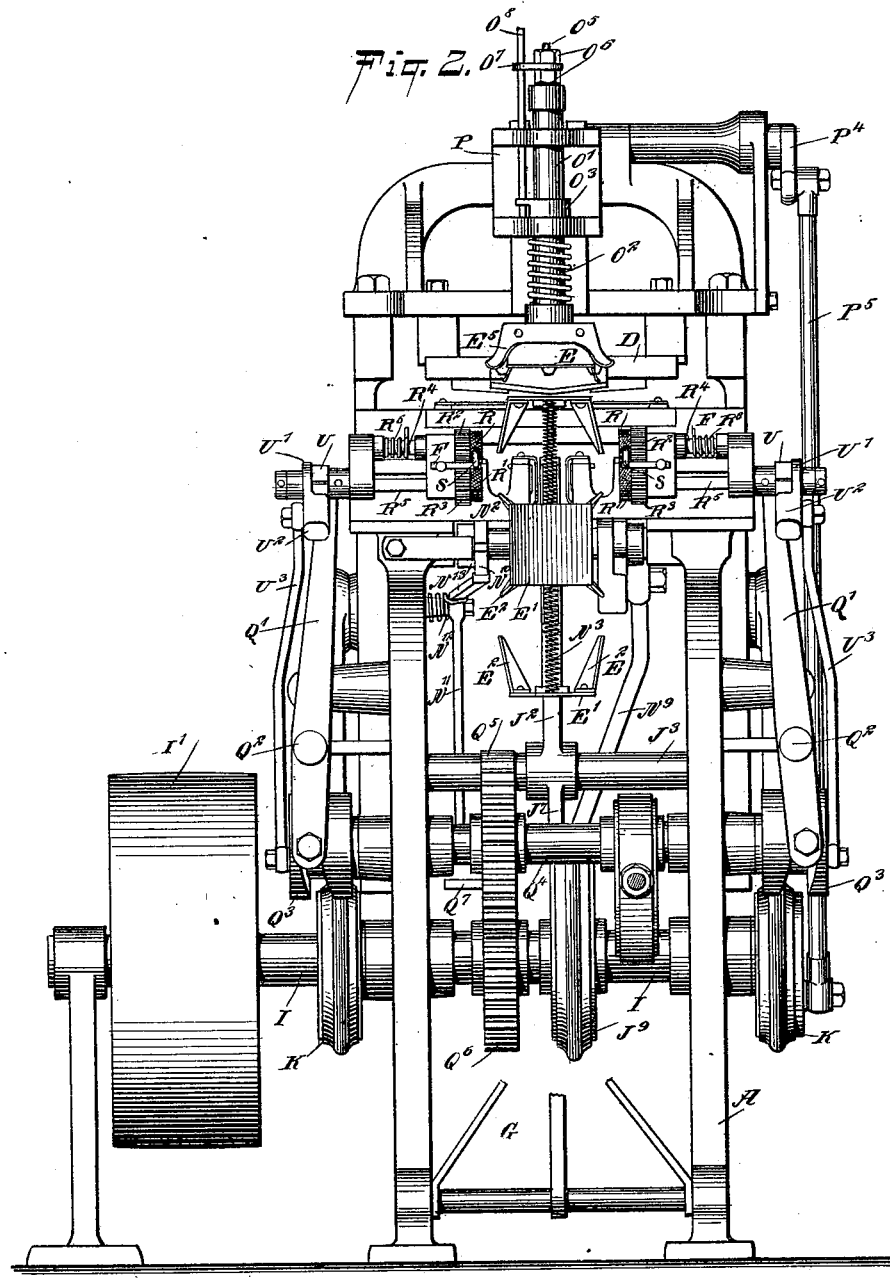
Figure 3:
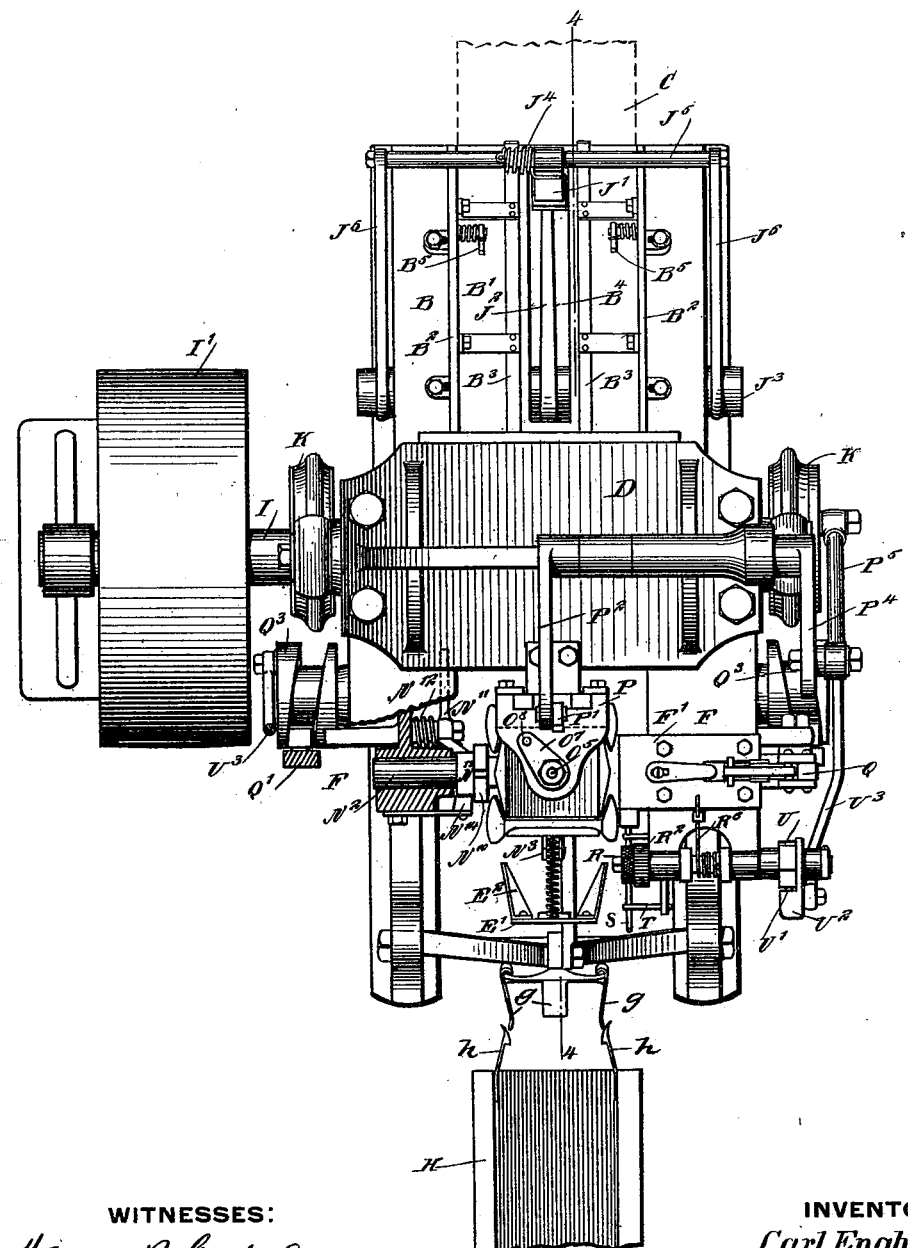
Figure 4:
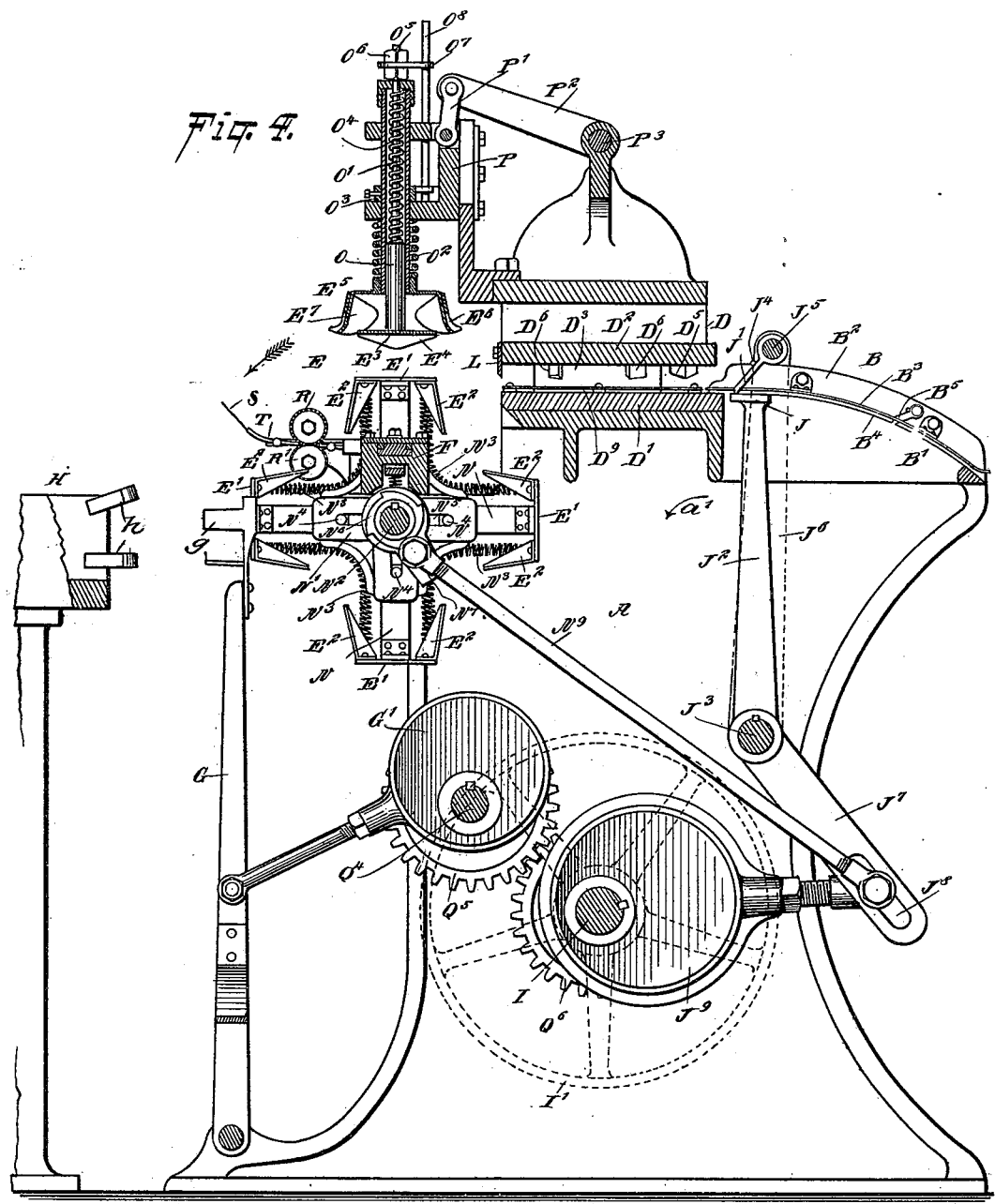
Figure 10:
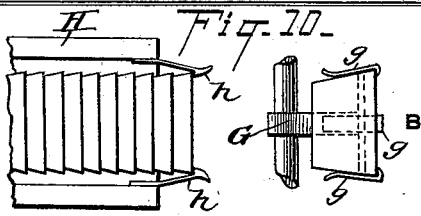

Figure 1 is a side elevation of the improvement. Fig. 2 is a front view of the same with part in section on the line 2 2 in Fig. 1. Fig. 3 is a plan view of the same with parts in section. Fig. 4 is a sectional side elevation of the same on the line 4 4 in Fig. 3. Fig. 5 is an enlarged transverse section of one of the stapling devices. Fig. 6 is an inverted plan view of the male die of the box-blank-forming device. Fig. 7 is a plan view of the female die of the box-blank-forming device. Fig. 8 is a plan view of the cut blank at the end of the stock. Fig. 9 is a plan view of the stapling device with parts broken out and showing the staple-driver in the act of forming the staple, and Fig. 10 is a detail plan view of the box-transferring arm and the receiving-trough.

The improved machine is mounted on a suitably-constructed frame A, supporting a feed mechanism B for intermittently feeding the stock C forward to the box-blank cutting and forming device D and for moving the finished blank to the folder E, by which the sides and flaps of the box-blank are folded to form a box-body, the latter while on the folder receiving staples which are driven into the opposite sides and the flaps folded thereon, the said staples being formed and driven by two oppositely-disposed stapling devices F of like construction. The finished box is finally removed from the folder E and transferred by an oscillating arm G to a receiver or trough H, the several devices and mechanisms mentioned being actuated synchronously, as hereinafter more fully described, from the main driving-shaft I, journaled in the frame A, and connected by a pulley I' and belt (not shown) with other machinery for imparting a rotary motion to the said shaft I.

The feed mechanism B is provided with a segmental guideway B', over which passes the stock C from a roll or the like, (not shown,) the side edges of the stock abutting against longitudinal side flanges B², supporting retainers B³ for holding the stock C on the guideway B', as will be readily understood by reference to Figs. 3 and 4. The guideway B' is provided at or near its middle with an elongated slot or recess B⁴, into which extend a pusher-head J and a pawl J', the pusher-head J engaging the under side of the stock and the pawl J' engaging the top of the stock above the head J. The head J and the pawl J' have an oscillating movement in unison, so that during the forward stroke of the head and pawl in the direction of the arrow *a'* the stock is fed forward and during the return stroke the pawl J' glides over the stock without moving the same, the stock being held in addition against return movement by spring-pressed dogs B⁵, carried by the longitudinal side flanges B², as indicated in Figs. 3 and 4. The head J is secured on the outer end of an arm J², secured on a transverse shaft J³, journaled in suitable bearings in the frame A, and the pawl J' is pressed on by a spring J⁴ and is held to turn loosely on a transverse rod J⁵, which also carries the spring J⁴, as is plainly indicated in Figs. 3 and 4. The ends of the rods J⁵ are held in arms J⁶, secured to the outer ends of the shaft J³, previously mentioned, so that when the shaft is rocked the head J and the pawl J' move in unison forward and backward, as described. On the shaft J³ is secured an arm J⁷, having an elongated slot J⁸, engaged by the free end of the eccentric-rod of an eccentric J⁹, carried by the shaft I, so that when the said shaft I is rotated a rocking motion is given by the eccentric J⁹ to the arm J⁷ to rock the shaft J³ for the purpose described.

During the forward stroke of the head J and the pawl J' the stock C is fed forward from the guideway B' between the female die D' and the male die D² of the box-blank cutting and forming device D to form the box-blank C'. The female die D' is held stationary on the frame A, while the male die D², located above the female die D', is provided with vertically-disposed arms D³, fitted to slide vertically in suitable guideways A', arranged on the inside of the frame A, as is plainly indicated in Fig. 1. The arms D³ are pivotally connected with the eccentric-rods K' of eccentrics K, secured on the main driving-shaft I, so that when the latter is rotated the said eccentrics impart a vertical reciprocating movement to the male die D², so as to move the same toward or from the female die D'.

The under side of the male die D² (see Fig. 6) is formed with oppositely-disposed triangular cutters D⁴, operating in conjunction with rests D⁵ in the female die D', so as to cut triangular pieces C² from the stock C, as indicated in Fig. 8. On the under side of the male die D² are secured or formed angularly-disposed cutters D⁶, operating in conjunction with corresponding recesses D⁷ in the female die D', so as to cut slits C³ in the box-blank C' to leave a center piece C⁴ and sides C⁵ and C⁶, having end flanges C⁷, the outer edges of which are cut off at an angle at the cut-out pieces C², previously mentioned. On the under side of the male die D² are also formed recesses D⁸, operating in conjunction with creasers D⁹ on the female die D' for forming creases between the center piece C⁴ and the sides C⁵ C⁶ when the male die moves into a lowermost position, and in order to form creases between the sides C⁶ and their flaps C⁷ the under side of the male die D² is provided with recesses D¹⁰, operating in conjunction with creasers D¹¹ on the female die D'. Circular cutters D¹² extend from the under side of the male die D² and operate in conjunction with apertures D¹³ in the female die D' to provide the sides C⁵ C⁶ with apertures for ventilating purposes. The under side of the male die D² is also provided with corrugations D¹⁴ D¹⁵, operating in conjunction with similar corrugations D¹⁵ D¹⁶ on the female die, so as to crease the sides C⁶ and the flaps C⁷ near their outer edges. On the forward edge of the male die D² is secured a knife L, operating in conjunction with the outer edge of the female die D', so as to cut off the box-blank at the next forward stroke of the feed device at the time the box-blank is in alinement with and engaged by the folder E and at the time a new box-blank is formed between the dies D' D².

The folder E consists, essentially, of a form and a reciprocating cross-head, and the form is provided with four platforms E', secured on the outer ends of independent arms N, standing at a right angle to one another and mounted to slide on a four-armed frame N', secured to a shaft N², extending transversely and journaled in the main frame A, said shaft receiving an intermittent rotary motion, as hereinafter more fully described. The platforms E' are pressed on by springs N³ for normally holding the arms N and the platforms E' in an outermost position, the outward movement of the said arms being limited by stop-pins N⁴, engaging slots N⁵ in the arms of the frame N', as is plainly shown in Fig. 4. Each platform E' is provided at the corners with inwardly-extending flanges E², standing at obtuse angles to the said platforms to form rests for the sides C⁵ C⁶ of the box-blank when the center piece C⁴ of the latter is resting on a platform. The said sides are successively pressed on or bent downward by the cross-head, which consists, essentially, of two successively-actuated plunger devices, of which one device is formed with a platform E³, located directly over that platform E' which is in an uppermost position at the time, and on said cross-head platform E³ are formed two flanges E⁴ for engaging the sides C⁵ of the box-blank and pressing the same upon the corresponding flanges E². The other plunger device E⁵ is in the form of a hood having a main set of flanges E⁶ and an auxiliary set of flanges E⁷, of which the former serve for first pressing the sides C⁶ down upon the corresponding flanges E², and the auxiliary set of flanges serve to firmly bend the flaps C⁷ upon the sides C⁵, the flaps overlapping each other to receive a staple for securing the flaps to the sides C⁵. The platform E³ is held on the lower end of a stem O, mounted to slide within a tubular stem O', carrying the hood E⁵, the latter being pressed on by a spring O², one end of which rests against the under side of a slide P, in which the tubular stem O' is mounted to slide in a vertical direction. The slide P is mounted to move in suitable guideways carried by the frame A and is pivotally connected by a link P' with an arm P², secured to a transverse shaft P³, mounted to turn in suitable bearings carried by the frame A. An arm P⁴ on the outer end of the shaft P³ is connected by a link P⁵ with one of the eccentrics K, secured on the shaft I, so that when the latter is rotated the said eccentric K imparts a swinging motion to the arm P⁴ by the link P⁵ to rock the shaft P³, and the movement of the latter causes an up-and-down sliding of the slide P by the action of the arms P² and the link P'. The downward sliding movement of the tubular stem O' is limited by a collar O³, which, however, allows an upward yielding of the hood E⁵ by compressing the spring O² correspondingly when the hood moves into a final position upon pressing the sides of the box into place. The stem O is pressed on by a spring O⁴, coiled around a reduced rod O⁵, forming part of the stem O and extending through the tubular stem O', nuts O⁶ being secured on the outer end of said rod O⁵ to limit the downward movement of the stem O and platform E³, but to allow the platform and stem to yield upwardly against the tension of the spring O⁴. The nuts O⁶ engage an arm O⁷, held on a rod O⁸, mounted to slide in suitable bearings on the slide P, so that the stem O and with it the platform E³ are held against turning in the tubular stem O'. Now it is evident that when a box-blank is pushed over upon the uppermost platform E' and the blank is cut off from the stock by the knife L and when the platform E³ moves downward the flanges E⁴ press the sides C⁵ down upon corresponding flanges E². When this is done, the further downward movement of the slide P brings the hood E⁵ into action so as to fold the sides C⁶ down upon the corresponding flanges E², and finally the flaps C⁷ are folded over upon the sides C⁵, and when the several parts are in this position the further downward movement of the slide P causes the platform E', with its arm N, to slide downward against the tension of the spring N³ to bring the opposite sides of the folded box-body in position to receive the staples from the two stapling devices F. When the staples are inserted and clenched, then the slide P moves back in an upward direction, so that the platform E³ and the hood E⁵ move out of engagement with the box-body, which now remains on the platform E' and its flanges E². A quarter-turn is now given to the shaft N², so as to give a like movement to the frame N' and to the arms N, carried thereby, so that the uppermost platform E', with the body thereon, moves to the left to allow the discharge-arm G to engage the box-body and to move it over into the receiver or trough H. The discharge-arm G is provided with arms $g$ for engaging and holding the box-body while being transferred to the trough H, and the said trough is provided with spring-catches $h$ for engaging the boxes as they are delivered thereto. At the end of the quarter-movement given to the frame N' a new platform E' is moved to the top to receive another box-blank, as above described.

In order to impart the desired movement to the shaft N² and the frame N', I provide the shaft with a ratchet-wheel N⁶, engaged by a pawl N⁷, held on an arm mounted to turn loosely on the shaft N² and connected by a link N⁹ with the arm J⁷, previously described, so that the swinging movement given to the said arm J⁷ causes a rocking of the said arm to cause the pawl N⁷ to intermittently turn the ratchet-wheel N⁶, and with it the shaft N² and the frame N'. In order to prevent the shaft N² from accidentally turning in the wrong direction, a locking device is provided, consisting of a reverse ratchet-wheel N¹⁰, secured on the shaft N² and adapted to be engaged by a locking-latch N¹¹, normally held in mesh with the ratchet-wheel N¹⁰ by a spring N¹², said latch being adapted to be engaged by a pin Q⁷, projecting from the gear-wheel Q⁵, as indicated in Fig. 2, so that the latch N¹¹ is moved out of engagement with the ratchet-wheel N¹⁰ to allow the shaft N² to turn by the action of the ratchet-wheel N⁶ and its pawl N⁷, previously referred to.

In order to avoid jarring of the form, a brake device is provided for the shaft N², said brake device consisting of a brake-pulley N¹³ on the shaft and engaged by a spring-pressed brake-block N¹⁴, as indicated in Figs. 2 and 3.

Each stapling device F is mounted on a block F', secured to the frame A, and on the inner end of each block is held an anvil F², extending in alinement with a pair of flanges E² when the top of the platform E' of the folder E is in a lowermost position, as shown in Fig. 5, said anvil thus being on the inside of the corresponding side C⁵ of the folded box-blank, and when the staple is driven through the overlapping flaps C⁷ and the corresponding sides C⁵ then the said anvil F² turns the staple ends over toward each other to clench the staple on the inside of the box side C⁵. The staple is driven by a staple-driver F³, mounted to slide in the block F', said driver also serving to form the staple from the end of a piece of wire extending in the staple-die F⁴. The driver F³ is pivotally connected at its outer end by a link Q with the upper end of a lever Q', fulcrumed at Q² on the main frame A. The lower end of the lever Q' carries a friction-roller engaging a cam-groove in a cam Q³, secured on a transverse shaft Q⁴, journaled in the frame A and carrying a gear-wheel Q⁵, in mesh with a gear-wheel Q⁶ on the main driving-shaft I. Thus when the latter is rotated a rotary motion is transmitted by the gear-wheels Q⁶ Q⁵ to the shaft Q⁴, so that the cams Q³ impart a swinging motion to the levers Q' to simultaneously reciprocate the two staple-drivers F³ of the stapling devices F for forming the staples and for driving the same for the purpose previously explained.

The die F⁴ is held on the free end of an arm F⁵, fulcrumed on the block F', and normally held in an uppermost position by a spring F⁶, so as to be in alinement with the free end of the staple-driver F³. On the arm F⁵ is formed a pin F⁷, having a beveled top adapted to be engaged by a beveled surface F⁸, formed on the staple-driver F³, so that after the staple is formed by the inward movement of the staple-driver F³ then the beveled surface F⁸ moves in engagement with the pin F⁷ to swing the arm F⁵ downward against the tension of the spring F⁶ and release the staple, which is now carried inward by the staple-driver F³ and finally driven through the overlapping flaps C⁷ and the corresponding sides C⁵ of the box-blank, the ends of the staple being clenched by the anvil F², as above stated.

The wire-feed for each stapling device F consists, essentially, of two feed-rolls R R', between which passes wire S from a roll, the wire being guided from the feed-rolls by stationary guides T. The feed-rolls R R' are connected with each other by gear-wheels $R^2 R^3$, and said feed-rolls are secured on shafts $R^4 R^5$, respectively, of which the shaft $R^5$ receives an intermittent turning motion from the cam $Q^3$, as indicated in Fig. 1. For this purpose the shaft $R^5$ carries a ratchet-wheel U, engaged by a pawl $U'$, fulcrumed on an arm $U^2$, mounted to turn loosely on the shaft $R^5$ and connected by a link $U^3$ with one side of the cam $Q^3$, so that when the latter is rotated a swinging motion is given to the arm $U^2$ to cause the pawl $U'$ to turn the ratchet-wheel U and with it the shaft $R^5$. The shaft $R^4$, carrying the upper feed-roll R, is pressed on by a spring $R^6$ for the purpose of feeding the wire. Now when the machine is in operation the feed-rolls R R' intermittently feed the wire S inward into a groove in the die $F^4$, and then the reciprocating movement of the staple-driver $F^3$ forms a staple of the wire in said die, cuts the staple from the wire, and moves the staple through the overlapping flaps and the sides of the box, as previously explained. When the staple-driver $F^3$ returns to its outermost position, then the arm $F^5$ again moves back into an uppermost position by the action of the spring $F^6$, after which the wire is again fed forward by the feed-rolls to bring a new end of the wire into the groove of the die $F^4$.

The arm G receives a swinging motion from the shaft $Q^4$ by means of an eccentric $G'$, held on said shaft $Q^4$ and connected by its eccentric-rod with the arm G, as is plainly indicated in Figs. 1 and 2.

The operation is as follows: When the main shaft I is rotated, then the stock-feeding mechanism intermittently feeds the stock, as previously described, so that the formed box-blank is over the form of the folder E, the reciprocating cross-head of the folder being above the said box-blank. A further rotation of the shaft I now causes a return movement of the said stock-feeding mechanism, while the male die $D^2$ now moves downward to cut off the box-blank $C'$ from the stock and to form a new box-blank from the stock between the dies. At the same time the reciprocating cross-head of the folder moves down to fold the sides and flaps of the box-blank in position on the flanges $E^2$ and to press the uppermost platform, with the box-body thereon, into a lowermost position, as indicated in Fig. 1. When the several parts are now in this position, the stapling devices F form staples and drive the same into the overlapping flaps $C^7$ of the sides $C^5 C^6$ to securely fasten the flaps and sides in position to complete the box. When this has been done, the reciprocating cross-head of the folder moves back into an uppermost position, thus allowing the springs $N^3$ to return the top platform back to an uppermost position, and then a quarter-turn is given to the folder, so as to bring the box in engagement with the arm G, which takes hold of the box and moves the same over into the trough H. During the return movement of the folder cross-head the die $D^2$ moves back into an uppermost position, and then the stock-feeding device again feeds the stock forward in the direction of the arrow $a'$. The above-described operation is then repeated. Thus it will be seen that during each revolution of the shaft I a box-blank is formed between the dies, a finished box-blank is formed into a box-body and stapled, and a finished box-body is removed from the form.

Having thus fully described my invention, I claim as new and desire to secure by Letters Patent—

1. A box-making machine, comprising an intermittent feed for the stock, a box-blank-forming device having dies, between which is passed the stock by the action of said feed, a folder receiving the box-blank from said box-blank-forming device, said folder consisting of a form and a reciprocating cross-head, stapling devices on opposite sides of the folder, to drive staples through the box sides and flaps, and to clench said staples, and means for engaging the finished box, removing it from the folder and bodily transferring the same to a receiver, substantially as shown and described.

2. A box-making machine, provided with a stock-feed mechanism, comprising a guideway having a slotted bottom, an oscillating head working in the slot of the said guideway, and adapted to engage the under side of the stock, and a pawl oscillating in unison with said head and engaging the top of the stock over the head, to push the stock forward, substantially as shown and described.

3. A box-making machine, provided with a stock-feed mechanism, comprising a slotted segmental guideway, transversely-adjustable side flanges for the guideway, retaining-bars over the guideway, a head in the slot of the guideway and secured on an oscillating arm, and a spring-pressed pawl carried by a second oscillating arm and adapted to engage the stock directly over the said head, substantially as shown and described.

4. A box-making machine, provided with a stock-feed mechanism, comprising a guideway having a slot in its bottom, an oscillating head working in the slot of the said guideway and adapted to engage the under side of the stock, a pawl oscillating in unison with said head and engaging the top of the stock over the head, to push the stock forward, and spring-pressed dogs for engaging the stock and holding it against backward movement during the return stroke of said head and pawl, substantially as shown and described.

5. A box-making machine, provided with a box-blank-forming device, comprising fixed and reciprocating dies, one of which is formed with a plurality of oppositely-arranged cutters and grooves and the other with recesses for the reception of the cutters, and creasers in alinement with said grooves, said dies also having registering corrugations, to score the stock and for ornamental purposes, substantially as shown and described.

6. A box-making machine, provided with a box-blank-forming device, comprising fixed and reciprocating dies, one of which is formed with a plurality of oppositely-arranged cutters and grooves and the other with recesses for the reception of the cutters, and creasers in alinement with said grooves, said dies also having punches, for punching apertures in the stock for ventilating purposes, substantially as shown and described.

7. A box-making machine provided with a box-blank-forming device, comprising fixed and reciprocating dies, one of the dies being formed with oppositely-arranged angular cutters, triangular cutters at one side of the angular cutters, and grooves, and the other with recesses and rests for the cutters, and with creasers in alinement with the grooves of the first die, substantially as herein shown and described.

8. A box-making machine, provided with a folder comprising a form and a reciprocating cross-head, the form having a plurality of slidable spring-pressed arms and platforms, with flanges at the corners, and said cross-head having a platform with flanges at two opposite sides, and a hood having opposite side flanges and auxiliary flap-flanges, said cross-head operating in conjunction with said form, to fold the box-blank into a box-body, substantially as shown and described.

9. A box-making machine, provided with a folder comprising a form and a reciprocating cross-head, the form having a plurality of slidable spring-pressed arms and platforms, with flanges at the corners, and said cross-head having a platform with flanges at two opposite sides, and a hood having opposite side flanges and auxiliary flap-flanges, said platform and hood being actuated successively, and said cross-head operating in conjunction with said form to fold the box-blank into a box-body, substantially as shown and described.

10. A box-making machine, provided with a folder comprising a form and a reciprocating cross-head, the form having a plurality of slidable spring-pressed arms and platforms, with flanges at the corners, and said cross-head having a platform with flanges at two opposite sides, a hood having opposite side flanges and auxiliary flap-flanges, and a reciprocating slide on which said hood is yieldingly mounted, said cross-head platform being yieldingly mounted on said hood, and said cross-head operating in conjunction with said form to fold the box-blank into a box-body, substantially as shown and described.

11. A box-making machine, provided with a folder comprising a form and a reciprocating cross-head, the form having a plurality of slidable spring-pressed arms and platforms, with flanges at the corners, and said cross-head having a platform with flanges at two opposite sides, a hood having opposite side flanges and auxiliary flap-flanges, said cross-head operating in conjunction with said form to fold the box-blank into a box-body, and means for imparting an intermittent turning motion to said form, to bring the form-platforms successively opposite the cross-head platform and hood, substantially as shown and described.

12. A box-making machine having a folder-form, comprising a frame having an intermittent turning movement, a plurality of arms slidable on said frame and each carrying a platform with flanges thereon, and springs pressing said arms outwardly and yieldingly holding them in the frame, substantially as shown and described.

13. A box-making machine having a folder-form, comprising a frame having an intermittent turning movement, a plurality of arms slidable on said frame and each carrying a platform with flanges thereon, springs pressing said arms outwardly and yieldingly holding them in the frame, and means for limiting the movement of the arms in the frame, substantially as shown and described.

14. A box-making machine having a folder cross-head, comprising a platform having flanges, a hood having main and auxiliary flanges, and a reciprocating cross-head in which the hood is yieldingly mounted, said platform being yieldingly mounted in the hood, substantially as shown and described.

15. In a box-making machine, a stapling device, comprising a stationary anvil, a reciprocating former and driver, a movably-supported die normally held in the path of the former and driver, and means for moving the die out of the path of the former and driver after the staple has been formed by the continued movement of the former and driver, as set forth.

16. In a box-making machine, a stapling device, comprising a stationary anvil, a reciprocating former and driver, a pivoted and spring-pressed die normally held in the path of the former and driver, and means for moving the die out of the path of the former and driver, after the staple has been formed by the continued movement of the former and driver, as and for the purpose set forth.

17. In a box-making machine, a stapling device, comprising a bed, an anvil fixedly secured at one end of the bed, a reciprocating former and driver mounted on the bed, and having a cam-surface on its lower face, a pivoted and spring-pressed arm provided with a projection extending into the path of the former and driver, and a die on the free end of the said arm, substantially as described.

18. A box-making machine having a form, comprising a shaft having a reciprocating turning motion, a frame secured thereon, arms slidable on the frame and carrying platforms with flanges, springs pressing the arms and platforms outwardly, and means for imparting an intermittent motion to said shaft, substantially as shown and described.

19. A box-making machine having a form, comprising a shaft having a reciprocating turning motion, a frame secured thereon, arms slidable on the frame and carrying platforms with flanges, springs pressing the arms and platforms outwardly, means for imparting an intermittent motion to said shaft, and a locking device for locking the shaft against return movement during the period of rest, substantially as shown and described.

20. A box-making machine having a form, comprising a shaft having a reciprocating turning motion, a frame secured thereon, arms slidable on the frame and carrying platforms with flanges, springs pressing the arms and platforms outwardly, means for imparting an intermittent motion to said shaft, and a brake mechanism for said shaft, substantially as shown and described.

21. In a box-making machine, a reciprocating cross-head, a tubular stem yieldingly mounted in the cross-head, a hood on the lower end of the stem and having main and auxiliary flanges, a platform having flanges and a stem to which the platform is secured, yieldingly mounted in the tubular stem of the hood.

22. In a box-making machine, a reciprocating cross-head, a tubular stem yieldingly mounted in the cross-head, a hood on the lower end of the stem and having main and auxiliary flanges, a platform having flanges at opposite sides, a stem to which the platform is secured, said stem extending through the upper end of the tubular stem, a spring surrounding the platform-stem in the tubular stem, an arm secured to the upper end of the platform-stem, and a rod carried by the arm and sliding in bearings in the cross-head, substantially as described.

23. In a box-making machine, a form, comprising an intermittently-rotating shaft, an armed frame secured to the shaft, a plurality of arms each independently and slidably mounted on an arm of the frame, a platform on each arm and having flanges at its corners, and springs yieldingly supporting the platforms and holding them in an outward position, substantially as described.

24. In a box-making machine, a form comprising an intermittently-rotating shaft, a four-armed frame secured to the shaft, and provided with slots, arms slidably mounted on the arms of the frame, and provided with pins working in the slots of the arms of said frame, platforms on the ends of the sliding arms, and springs for holding the platforms and arms in an outermost position substantially as described.

25. In a box-making machine, the combination with intermittently-rotating forms, of an arm mounted to swing toward and from the forms and provided with means for receiving a box from the forms and holding the same while it is being swung away from the forms, and a receptacle for receiving the box from the arm, said receptacle being provided with means for engaging the box delivered thereto by said arm, substantially as described.

26. In a box-making machine, the combination with intermittently-rotating forms, of an arm pivoted at its lower end to swing toward and from the forms, said arm being provided at its upper end with arms for receiving a box from the forms holding the same, and means for imparting a swinging movement to said arm, and a trough for receiving the box from the arm, said trough being provided with spring-catches for engaging the box delivered thereto by the said arm, substantially as described.

27. In a box-making machine, the combination with a guideway having a longitudinal slot in its bottom, of a rock-shaft, an arm secured to the rock-shaft and provided with a head working in the slot of the guideway, arms secured to the rock-shaft and projecting above the guideway, and a pawl carried by said arms, substantially as described.

28. In a box-making machine, the combination with a guideway having a longitudinal slot in its bottom, of a rock-shaft, an arm secured to the shaft and working in the slot of the guideway, arms secured to the ends of the shaft and projecting above the guideway, a rod connecting the upper ends of the arms and a spring-pressed pawl mounted on the said rod, substantially as described.

In testimony whereof I have signed my name to this specification in the presence of two suscribing witnesses.

CARL ENGBERG.

Witnesses:
IRVING W. ALLEN,
LAWRENCE C. FYFE.